United States Patent Office 2,932,638
Patented Apr. 12, 1960

2,932,638

PROCESS FOR THE MANUFACTURE OF 3-CYCLO-KETAL DERIVATIVES OF PREGNAN-3,11,20-TRIONES AND REDUCTION PRODUCTS THEREOF AND COMPOUNDS OBTAINED THEREBY

David H. Gould, Palisades Park, and Emanuel B. Hershberg, West Orange, N.J.

No Drawing. Application June 4, 1952
Serial No. 291,783

11 Claims. (Cl. 260—239.55)

Our invention relates to the manufacture of 3-monocycloketals (3-monodioxolanes) of polyketo compounds of the saturated and unsaturated pregnan series having in the 21-position a hydroxyl group or a functional derivative thereof, and to the 3-monocycloketals of the 21-substituted polyketo pregnanes of the saturated and unsaturated series, and including both the normal and allo-series in the case of the saturated compounds.

It is the general object of the present invention to provide an improved procedure for preparing the 3-monocycloketals of 3,20-diketopregnanes substituted in the 21-position by a hydroxyl group or a functional derivative thereof and having also at the 11- and/or 12-positions a hydroxyl or keto group, there being at the 17-position either hydrogen or α-hydroxyl. (The term pregnanes will, for brevity, be hereinafter employed in the generic sense as including both the nuclearly saturated and nuclearly unsaturated compounds, except where expressly restricted to the saturated compounds.)

It is a further object of the invention to provide 3-monocycloketals of 21-substituted-3,20-diketo pregnanes having in at least one of the 11- and 12-positions, and preferably the 11-position, a keto or hydroxyl group, and particularly of the 3,20-diketopregnane compounds of the cortical hormone group, which are characterized by physiological activity or can be employed as intermediates for the preparation of physiologically active hormones of the cortical group or related to such group.

It is a still further object of the invention to provide a simple and efficient procedure for obtaining 3-monocycloketals of pregnan-21-ol-3,20-diones.

Additional objects of the invention will appear from the more detailed description thereof hereinafter.

In the copending application of Eugene P. Oliveto, David H. Gould and Temple Clayton, entitled "Process for the Selective Reduction of Polyketo-pregnanes and Products Obtained Thereby," filed simultaneously herewith, Serial No. 291,781, now abandoned, there is described a general process for the manufacture of 3,20-bis-cycloketals (or dioxolanes) of 3,20-diketopregnanes having a third keto group in the 11- or 12-position; while in their application entitled "Process for the Selective Reduction of Polyketopregnan-21-ols and Products Obtained Thereby," filed simultaneously herewith, Serial No. 291,782, there is described a process for the manufacture of 3,20-bis-cycloketal derivatives of similar triketopregnanes in which, however, a hydroxyl group is present at C-21.

We have found that in the case of the 3,20-diketopregnanes having a hydroxyl or keto group attached to C-11 or C-12, a selective cycloketalization at C-3 can be effected, the 20-keto group remaining free, if there is present at C-21 a functional derivative of a hydroxyl group, such as an ester or ether group. In this way, the 3-monocycloketals of polyketo pregnanes can readily be obtained which are themselves physiologically active or can be converted to physiologically active steroids. By thus blocking the 3-keto group, various chemical operations can be performed on the free keto groups, such as reduction, after which, if desired, the 3-cycloketal group can be split off to regenerate the 3-keto group.

We have found that on reaction of a 21-functional derivative of a pregnane-21-ol-3,20-dione, substituted in the 11- or 12-position as above indicated, with a 1,2-glycol, only the 3-keto group will condense with the glycol to form a dioxolane group, while the 20-keto group, and any keto group that may be present in the 11- or 12-position remain unaffected. After the cycloketalization, the 21-substituent (such as an acyl or ether group) can be hydrolyzed to produce the free 21-hydroxy compound under conditions which will not split off the dioxolane group.

The 1,2-glycol can be aliphatic or cycloaliphatic in nature, suitable glycols of this type being ethylene glycol, 1,2-propylene glycol, 1-2-butylene glycol, 1,2-cyclohexanediol (cis), etc.

The preferred starting compounds of our process are of the following general formula, the same including compounds of both the normal and allo-series in the case of the nuclearly saturated compounds:

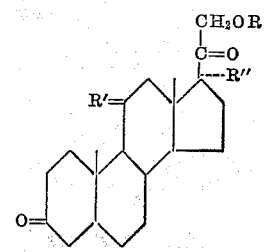

wherein:

R is the acyl group of aliphatic or aromatic carboxylic acid (for example, acetyl, propionyl, butyryl, valeryl, benzoyl, etc.), an alkyl group (preferably a lower alkyl group like methyl, ethyl, propyl, butyl, amyl), an aralkyl group (preferably benzyl), or a cycloaliphatic group (like cyclopentyl and cyclohexyl);

R' is O= or

while R'' is H or OH, there being a double bond attached to C–5 in the case of the nuclearly unsaturated compounds.

The monocycloketal compounds of the present invention are of the same general formula as indicated above except that the 3-keto group is replaced by a cycloketal group, which in the case of ketalization with ethylene glycol, is the group

As already stated, the ester or ether group in the 21-position can be hydrolyzed to replace it with a free hydroxyl group; and as also previously indicated, R' can be attached to the 12-carbon. It will thus be seen that in view of the substitution in the 21-hydroxyl group, the 20-keto group has become non-reactive toward the 1,2-glycol.

We have found that the 3-spirodioxolane derivatives of known physiologically active compounds having a 3-ketal group and in which the 3-keto group has been protected by the dioxolane group, possess therapeutic activity comparable and even equal to that of the original compound, and this is true particularly in the case of cortisone and its acetate, which makes the dioxolane derivatives of greater interest and importance than merely as routes to other compounds. For example, the following dioxolanes are active in the usual biological tests for adrenal hormones, such as the maintenance of life of adrenalectomized mice:

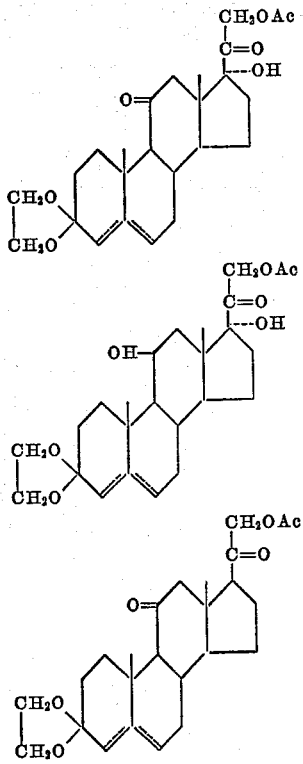

In the above formulae, Ac stands for the acyl group of an aliphatic or aromatic carboxylic acid, as defined above, and preferably the acetyl group, the dotted lines in the 4, 5- and 5, 6-positions indicating that the position of the double bond is not certain, it being known only that it runs from the 5-position. As these derivatives differ also in certain physical properties from cortisone and its esters, they present advantages in clinical use over the known compounds in certain cases.

The invention will be further described in the following examples which are presented only for purposes of illustration:

EXAMPLE 1

$\Delta^4$-pregnen-11β, 21-diol-3,20-dione-acetate-3-proylene ketal

One gram of corticosterone acetate is suspended in 100 ml. of benzene and treated with 2 ml. of propane-1,2-diol and 10 mg. of methane sulfonic acid. The mixture is boiled for 8 hours trapping water as it distills out. The mixture is treated with dilute aqueuos sodium hydroxide till basic, and the excess glycol is washed out with water. Evaporation of the solvent gives a crude solid mixture of steroisomers of the 3-spirodioxolane of $\Delta^4$-pregnen-11β, 21-diol-3,20-dione acetate which may be used therapeutically directly. The isomers, which are due to the asymmetry of propanediol, may be separated by chromatography from benzene on magnesium silicate to obtain the pure crystalline products, crystallizable from ethyl acetate.

EXAMPLE 2

Allopregnan-17α,21-diol-3,11,20-trione-21-acetate-3-cyclohexane ketal

One gram of allopregnan-17α,21-diol-3,11,20, trione-21-acetate is dissolved in 50 ml. of ethylene chloride and treated with 2 ml. of ciscyclohexane-1,2-diol and 10 mg. of benzene sulfonic acid. The solution is refluxed for 10 hrs., while the refluxing liquid is returned through a trap containing anhydrous calcium sulfate to remove the water present. The solution is made basic with ammonia water and washed with water to remove excess glycol. The dried solution is evaporated to give a crystalline residue. This is purified by chromatography on ethyl acetate-washed alumina, eluting with benzene, and crystallizing from ethyl acetate to obtain the 3-(cyclohexanediol) ketal of the starting material.

EXAMPLE 3

$\Delta^4$-pregnen-17α,21-diol-3,11,20-trione-21-acetate-3-ethylene ketal

Two grams of cortisone acetate are suspended in 40 cc. of toluene and treated with 1.4 cc. of ethylene glycol and a crystal of p-toluene sulfonic acid. The mixture is boiled under reflux for 18 hrs., trapping water as it is distilled out. After one hour the solid dissolves. At 18 hours a precipitate has formed. The mixture is made basic with pyridine and the product is filtered off. Crystallization from pyridine or dioxane gives the 3-spirodioxolane of cortisone acetate, M.P. 260–275° C.

This material is useful in treating adrenal disfunction and has other therapeutic properties.

EXAMPLE 4

$\Delta^4$-pregnen-17α,21-diol-3,11,20-trione-3-ethylene ketal

Cortisone-3-spirodioxolane-21-acetate is suspended in 50 volumes of methanol and treated with 0.25 part of potassium bicarbonate (10% in water). The mixture is refluxed under $N_2$ for ½ hour and concentrated in vacuo. The residue is crystallized from dilute acetone to give cortisone-3-dioxolane, M.P. 198–205° dec.

EXAMPLE 5

21-ethoxy-pregnan-17α-ol-3,11,20-trione-3-ethylene ketal

One gram of 21-ethoxy pregnan-17α-ol-3,11,20-trione is suspended in 20 ml. of ethylene chloride, treated with 1 ml. of ethylene chloride, treated with 1 ml. of ethylene glycol and 10 mg. of p-toluene sulfonic acid, and refluxed 16 hrs. The distillate is returned to the flask through a tube filled with anhydrous calcium sulfate to remove the water as formed. The solution is cooled, washed with 10% sodium hydroxide solution and with water till neutral. The dried solution is evaporated and the residue is crystallized from isopropanol to give the crystalline 21-ethoxypregnan-17α-ol-3,11,20-trione-3-ethylene ketal.

EXAMPLE 6

$\Delta^4$-pregnen-21-ol-3,11,20-trione-acetate-3-ethylene ketal

One g. of $\Delta^4$-pregnen-21-ol-3,11,20-trione acetate is dissolved in 60 ml. of toluene and treated with 2 ml. of ethylene glycol and 0.02 g. of p-toluene sulfonic acid. The mixture is refluxed 16 hrs. and the water in the distillate is trapped in a Dean-Stark tube. The solution is washed with dilute sodium hydroxide, dried over sodium sulfate and evaporated to dryness. The crystalline 3-mono-spiro-dioxolane of $\Delta^4$-pregnen-21-ol-3,11,20-trione acetate (Kendall's compound A acetate) is obtained by crystallizing from isopropanol.

EXAMPLE 7

$\Delta^4$-pregnen-21-ol-3,11,20-trione-3-ethylene ketal

The 3-ketal of pregnenoltrione acetate from Example 6 is suspended in 40 volumes of methanol and nitrogen is bubbled through the mixture. To this is added 0.25 part of potassium bicarbonate in 10% aqueous solution, while stirring and maintaining the nitrogen atmosphere. Stirring is continued for 18 hours. The mixture is concentrated in vacuo and the crystalline 3-ketal of $\Delta^4$-pregnen-21-ol-3,11,20-trione is obtained by the addition of water. It may be recrystallized from isopropanol.

EXAMPLE 8

Δ⁴-pregnen-11β,17α,21-triol-3,20-dione-21-acetate-3-ethylene ketal

One-half gram of 17α-hydroxy-corticosterone acetate is dissolved in 20 ml. of ethylene chloride and treated with 1 ml. of ethylene glycol and 0.01 g. of p-toluene sulfonic acid. The solution is refluxed 18 hours and the refluent fluid is returned to the flask through a tube containing anhydrous calcium sulfate to remove water. The solution is treated with pyridine till basic, washed with water and evaporated to dryness. The residue, the 3-monoethylene glycol ketal of Δ⁴-pregnen-11β,17α,21-triol-3,20-dione-21-acetate, may be recrystallized from ethyl acetate.

EXAMPLE 9

Δ⁴-pregnen-11β,17α,21-triol-3,20-dione-3-ethylene ketal

The 3-mono ketal of 17α-hydroxycorticosterone acetate from Example 8 is dissolved in 20 volumes of dioxane and treated with 1.1 equivalents of 5% sodium hydroxide. The mixture is stirred rapidly under nitrogen for 24 hours, and one-half the solvent is removed in vacuo. Addition of 5 volumes of water gives the 3-ethylene ketal of Δ⁴-pregnen-11β,17α,21-triol-3,20-dione, which may be recrystallized from ethylene chloride-methanol and a trace of pyridine.

We claim:

1. The 3-monoethylene glycol ketal of Δ⁴-pregnen-11β,17α,21-triol-3,20-dione-21-acetate.
2. The 3-spirodioxolanes of compounds of the formula

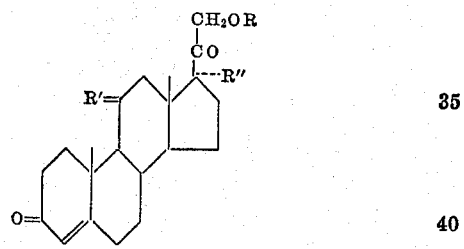

wherein:
R is a member of the group consisting of H, lower alkyl and lower alkanoyl radicals;
R' is a member of the group consisting of O and H, OH; and
R" is a member of the group consisting of H and OH, the spiro-dioxolane group being formed of a member of the group consisting of ethylene glycol, 1,2-propylene glycol, 1,2-butylene glycol and 1,2-cis-cyclohexanediol.

3. The 3-mono-ethylene glycol ketal of cortisone acetate.
4. The 3-mono-ethylene glycol ketal of cortisone.
5. The 3-mono-ethylene glycol ketal of 4-pregnen-21-ol-3,11,20-trione.
6. Process for the manufacture of 3-mono-spiroketals of 4-pregnen-3,20-diones, which comprises heating and reacting a compound of the formula

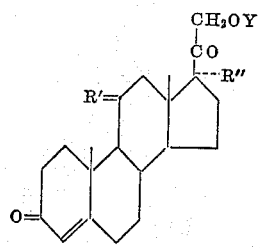

wherein:
R' is a member of the group consisting of O and H, OH;
R" is a member of the group consisting of H and OH; and
Y is a member of the group consisting of lower alkyl and lower alkanoyl radicals, with a 1,2-glycol of the group consisting of ethylene glycol, 1,2-propylene glycol, 1,2-butylene glycol and 1,2-cis-cyclohexanediol.

7. Process according to claim 6, wherein the starting compound is cortisone acetate and the glycol is 1,2-ethylene glycol.
8. Process according to claim 6, wherein the starting compound is 4-pregnen-11β,17α,21-triol-3,20-dione-21-acetate.
9. Process according to claim 6, including the step of hydrolyzing the substituent at the 21-position by heating the same with an alkali metal base.
10. A compound of the formula:

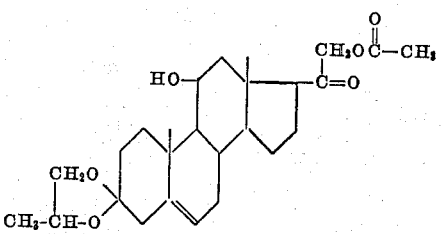

11. A compound of the formula:

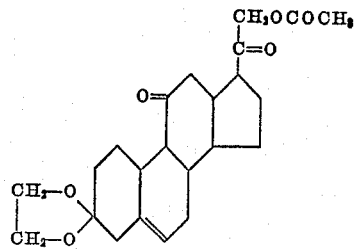

References Cited in the file of this patent

UNITED STATES PATENTS

| 2,288,854 | Stavely | July 7, 1942 |
| 2,302,636 | Koster | Nov. 17, 1942 |
| 2,356,154 | Fernholz | Aug. 22, 1944 |
| 2,622,081 | Bernstein | Dec. 16, 1952 |
| 2,646,434 | Bernstein | July 21, 1953 |

FOREIGN PATENTS

| 236,519 | Switzerland | 1945 |
| 234,924 | Switzerland | 1945 |

OTHER REFERENCES

Feiser and Feiser: Natural Products related to Phenanthrene, 3rd edition, 1949, pp. 437 and 407.